(12) United States Patent
Wagner et al.

(10) Patent No.: US 11,610,120 B2
(45) Date of Patent: Mar. 21, 2023

(54) SYSTEMS AND METHODS FOR TRAINING A NEURAL NETWORK

(71) Applicant: Microsoft Technology Licensing, LLC, Redmond, WA (US)

(72) Inventors: Andy Wagner, Cupertino, CA (US); Tiyasa Mitra, San Jose, CA (US); Marc Tremblay, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 392 days.

(21) Appl. No.: 16/870,143

(22) Filed: May 8, 2020

(65) Prior Publication Data

US 2021/0350226 A1    Nov. 11, 2021

(51) Int. Cl.
*G06N 20/00* (2019.01)
*G06N 3/08* (2023.01)
*G06K 9/62* (2022.01)
*G06N 3/04* (2023.01)

(52) U.S. Cl.
CPC .............. *G06N 3/08* (2013.01); *G06K 9/6256* (2013.01); *G06N 3/0454* (2013.01)

(58) Field of Classification Search
CPC ...... G06N 3/084; G06N 3/063; G06N 3/0454; G06N 3/08; G06N 3/04; G06N 3/0481; G06N 3/0445; G06N 20/00; G06N 3/082; G06N 3/02; G06N 20/20; G06N 3/0472; G06N 3/06; G06N 5/003; G06N 5/046; G06F 7/483; G06F 7/544; G06F 1/03; G06F 9/5027; G06F 9/3001; G06F 2009/4557; G06K 9/6263; G06K 9/6298; G06T 1/20; G06T 2207/20081; G06T 3/0056; G06T 5/005

See application file for complete search history.

(56) References Cited

U.S. PATENT DOCUMENTS

| | | | |
|---|---|---|---|
| 2019/0258933 A1* | 8/2019 | Baughman | H04L 67/535 |
| 2020/0034627 A1* | 1/2020 | Zhu | G06V 20/41 |
| 2020/0073485 A1* | 3/2020 | Al-Halah | G06N 3/08 |
| 2020/0167943 A1* | 5/2020 | Kim | G06K 9/6267 |
| 2021/0285819 A1* | 9/2021 | Poli | G01B 9/02049 |

OTHER PUBLICATIONS

Pasquale, Luca Di, "Analysis of Deep Neural Networks based on Feedback Alignment algorithms", Retrieved from: https://webthesis.biblio.polito.it/10994/1/tesi.pdf, Apr. 2019, 90 Pages.
"International Search Report and Written Opinion Issued in PCT Application No. PCT/US21/028044", dated Jul. 29, 2021, 13 Pages.

* cited by examiner

*Primary Examiner* — Quan M Hua
(74) *Attorney, Agent, or Firm* — Fountainhead Law Group PC

(57) ABSTRACT

Embodiments of the present disclosure include systems and methods for training neural networks. In one embodiment, neural network may receive input data and produce output results in response to the input data and weights of the neural network. An error is determined at an output of the neural network based on the output results. The error is propagated in a reverse direction through the neural network from the output and one or more intermediate outputs to adjust the weights.

15 Claims, 7 Drawing Sheets

SYSTEMS AND METHODS FOR TRAINING A NEURAL NETWORK

BACKGROUND

The present disclosure relates to a computing. More particularly, the present disclosure relates to techniques for training a neural network.

Figure 1:
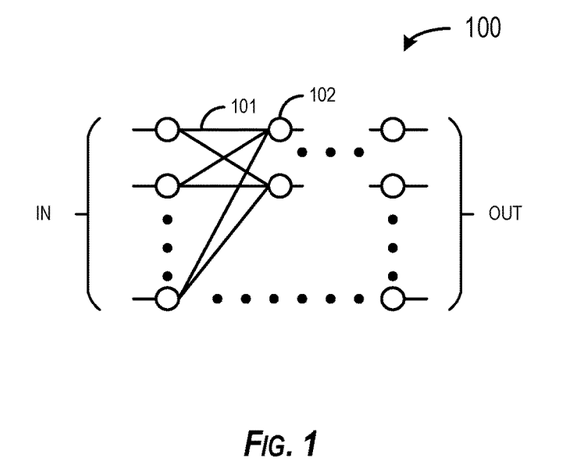
FIG. 1 illustrates a neural network.

Artificial neural networks (hereinafter, neural network) have become increasingly important in artificial intelligence applications and modern computing in general. An example neural network is shown in FIG. 1. Neural network 100 receives input values corresponding to features to be recognized. The input values are multiplied by weights (represented by edges 101) and added together (e.g., summed) in nodes 102. An activation function is applied to the result in the nodes 102 to generate an output value. Values are combined across multiple nodes and layers of nodes to produce network output values corresponding to a result.

Such systems "learn" to perform tasks by considering examples, generally without being programmed with task-specific rules. Initially, the weights may be untrained. During a training phase, input values for corresponding known results are processed by the network, and a difference (or error) between the network output values and the known values is determined. The weights may be adjusted based on the error using a process known as backpropagation, where computations flow through the neural network in the reverse direction (e.g., from the output to the input). Training may involve successively adjusting weights across many input samples and corresponding known network output values. This is often referred to as the training phase. Once trained, the system may receive inputs and produce meaningful results (e.g., classification or recognition). This is often referred to as the inference phase.

Training for very large neural networks may involve a massive number of computations. Additionally, memory usage is a problem with neural networks in general. Neural networks with large depths may be required to store activations for the whole depth of the network. This problem is compounded when the network uses pipelining, which may cause the memory size to increase significantly. In some neural networks, a pipeline may cause the memory size to grow quadratically, for example.

The present disclosure pertains to neural network training techniques that reduce memory usage and provide other benefits.

BRIEF DESCRIPTION OF THE DRAWINGS

Various embodiments of the present disclosure are illustrated by way of example and not limitation in the figures of the accompanying drawings.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 2:
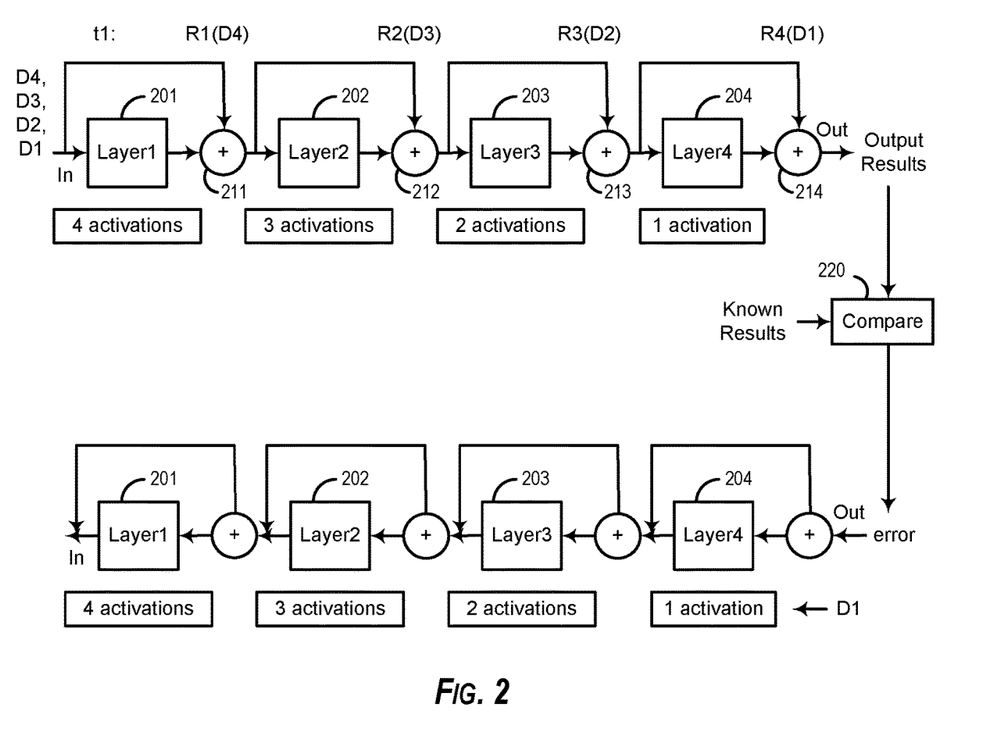
FIG. 2 illustrates training a neural network.

FIG. 2 illustrates training a neural network. In this example, four (4) layers 201-204 of a residual neural network are configured in a pipeline. Residual neural networks (NN) are a category of neural networks that utilize skip connections, or shortcuts to jump over some layers. In this example, each layer's output is added to the layer's input using adders 211-214. Various residual NN models may be implemented with one or more layer skips, for example. In some example residual NNs, an additional weight matrix may be used to learn skip weights. Models with several parallel skips may also be used. One motivation for skipping over layers is to avoid the problem of vanishing gradients, which is when the gradients across the layers of the neural network may decrease as the depth increases. Residual NNs avoid this by reusing activations from a previous layer until the adjacent layer learns its weights.

Input data is received at an input, IN, of the pipeline and is successively processed by each layer. Input data may be continuously received by the network to produce a steam of output results. In this example, an input data sequence of D1, D2, D3, and D4 are shown for illustrative purposes. One challenge with training some neural networks is that networks with large numbers of layers require more memory. FIG. 2 illustrates data flowing through the network. Output results at the output of the network, OUT, may be compared with known results at 220 to produce an error. The error is coupled to the output and propagated through the network in the reverse direction (i.e., backpropagation) to produce new values for the weights. For example, at each layer a difference in each layer's weights may be determined. However, as shown in FIG. 2, each layer may be required to store activations to be able to perform backpropagation. Activation functions are mathematical equations that determine the output of a neural network. Activations refers to the values of the weights, for example, that produced a particular output at a particular time. Data may be flowing through the network continuously, and weights may be changing, and thus activations at particular times may be stored. In this example, a four (4) layer network may be required to store 4 activations. For example, at time t1, output results from layer 4 for corresponding input data D1 (e.g., R4(D1)) may be generated at the network output. However, as illustrated, other results at intermediate outputs may be flowing through the system (e.g., R3(D2) results for D2 at the output of layer 3, R2(D3) results for D3 at the output of layer 2, and R1(D4) results for D4 at the output of layer 1). If training is occurring at for each output result, then the weights used to generate each output at each layer may be stored. For example, to adjust the weights for R4(D1), layer 1 must remember the activations used when it processed D1. Accordingly, weights corresponding to results for D1, D2, D3, and D4 may require storage of four (4) activations in layer 1. For neural networks with many layers, large memories may be required. Additionally, convergence of the weights may be very long.

Figure 3:
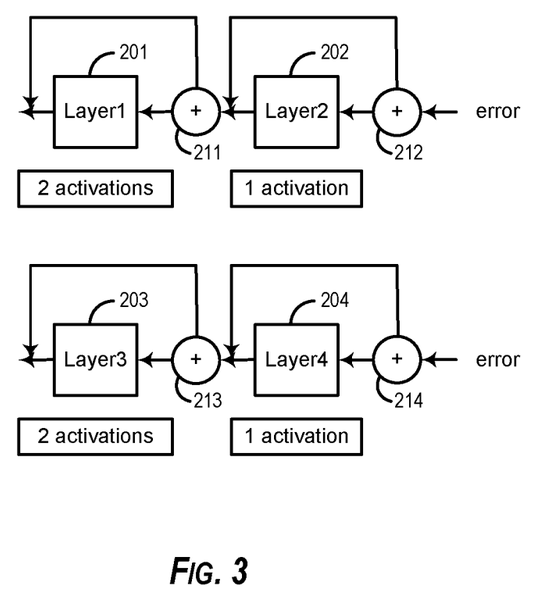
FIG. 3 illustrates training an example residual neural network according to an embodiment.

Features and advantages of the present disclosure include coupling the error to intermediate outputs of a neural network. FIG. 3 illustrates training an example residual neural network comprising four (4) layers 201-204 according to an embodiment. Here, the network has been segmented into two sections between layer two (2) 202 and layer three (3) 203 and both sections perform backpropagation (e.g., the error flows through the network in the reverse direction). The error is coupled to the output of the complete network (e.g., at adder 214) and an intermediate output (e.g. at adder 212). Advantageously, since each section of the segmented network has fewer layer, there are fewer activations stored for training purposes. In this example, the network is segmented into two equal sections. Thus, the number of stored activations is reduced by a factor of two. In other embodiments, other segmentations may be made based on the topology of the network and performance considerations, for example.

Figure 4:
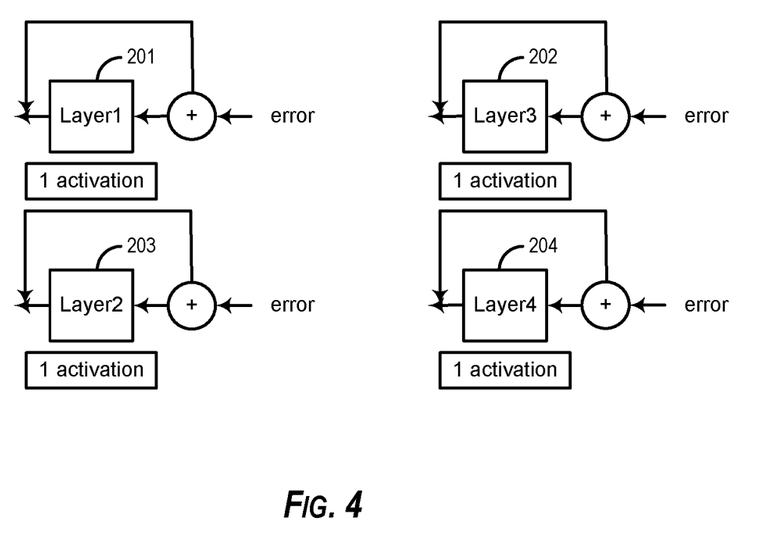
FIG. 4 illustrates segmenting a neural network according to another embodiment.

FIG. 4 illustrates segmenting a neural network according to another embodiment. In this example, the network has been further segmented into individual layers. Accordingly, memory requirements are further reduced down to just one activation.

Some embodiments of the present disclosure may apply errors calculated at the output of the network to intermediate outputs of layers in the network. It has been observed, in some network topologies, that weights across different layers may converge to similar values across some layers. Training may be expedited by coupling an output error directly to both the output and one or more intermediate outputs. This technique may advantageously result in both reduced memory requirements and faster convergence, for example.

Figure 5:
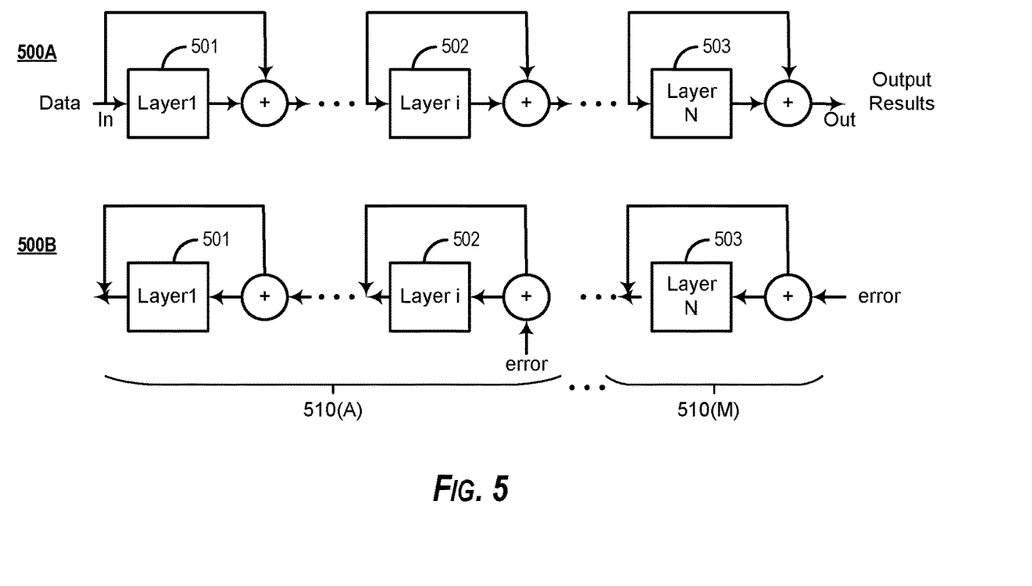
FIG. 5 illustrates segmenting a generalized N layer neural network according to an embodiment.

FIG. 5 illustrates segmenting a generalized N layer neural network according to an embodiment. 500A illustrates a network configured to process data in a forward direction, and 500B illustrates the network configured to process an error in a reverse direction to update weights in each layer of the network, for example. In this example, input data may be received on an input, IN, of a first layer 501 and processed in the forward direction across N layers of a pipeline to produce output results on an output, OUT, of a last layer 503. The network may comprise a plurality of intermediate outputs, such as an intermediate output on an ith layer 502, for example. Each layer may comprise weights, which are updated based on an error calculated using the output results and known results as described above. In this example, the error is directly coupled to the output and directly coupled to one or more intermediate outputs. The network may be segmented into a plurality of sections 510(A)-510(M) illustrated by brackets in FIG. 5, which shows the error directly coupled to an intermediate output of a last layer (e.g., the ith layer). It is to be understood that multiple additional sections after the ith layer may receive the error on an intermediate output of a last layer of each section, for example. Using the above described technique, a variety of training schemes may be employed. In various embodiments, the sections may include an equal number of layers, for example. In some embodiments, the network may be segmented into a number of sections is equal to a power of two (2). For example, a network with 40 layers may be divided into 8 sections of 5 layers each, 4 sections of 10 layers each, or 2 sections of 20 layers each, for example.

Figure 6:
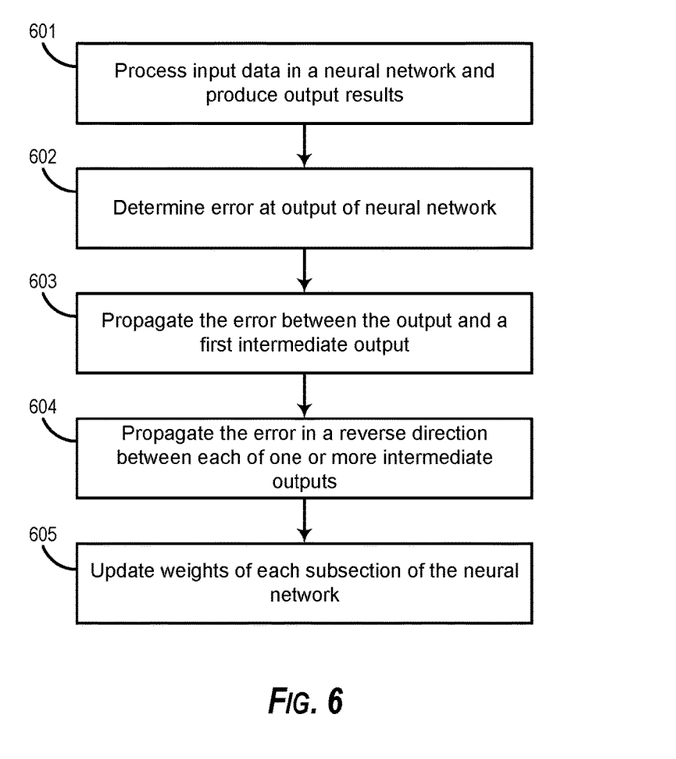
FIG. 6 illustrates a method of training a neural network according to an embodiment.

FIG. 6 illustrates a method of training a neural network according to an embodiment. As described in detail above, embodiments of the present disclosure may determine an error at an output of a residual feedforward neural network based on output results generated in response to input data and weights of the residual feedforward neural network. The error may be propagated in a reverse direction through the residual feedforward neural network from the output and one or more intermediate outputs of the residual feedforward neural network (e.g., independently through each section) to adjust the weights of the residual feedforward neural network. For example, at 601, input data is processed in a neural network to produce output results. The output results for a particular data input may be compared to known results for that data input. Accordingly, at 602, an error is determined at the output of the neural network. At 603, the error is propagated between the output of the neural network and a first intermediate output (e.g., where the network is segmented). At 604, the error is coupled to one or more intermediate outputs and propagated in a reverse direction between each of the one or more intermediate outputs. Weights in layers of each subsection of the network are updated at 605.

Figure 7:
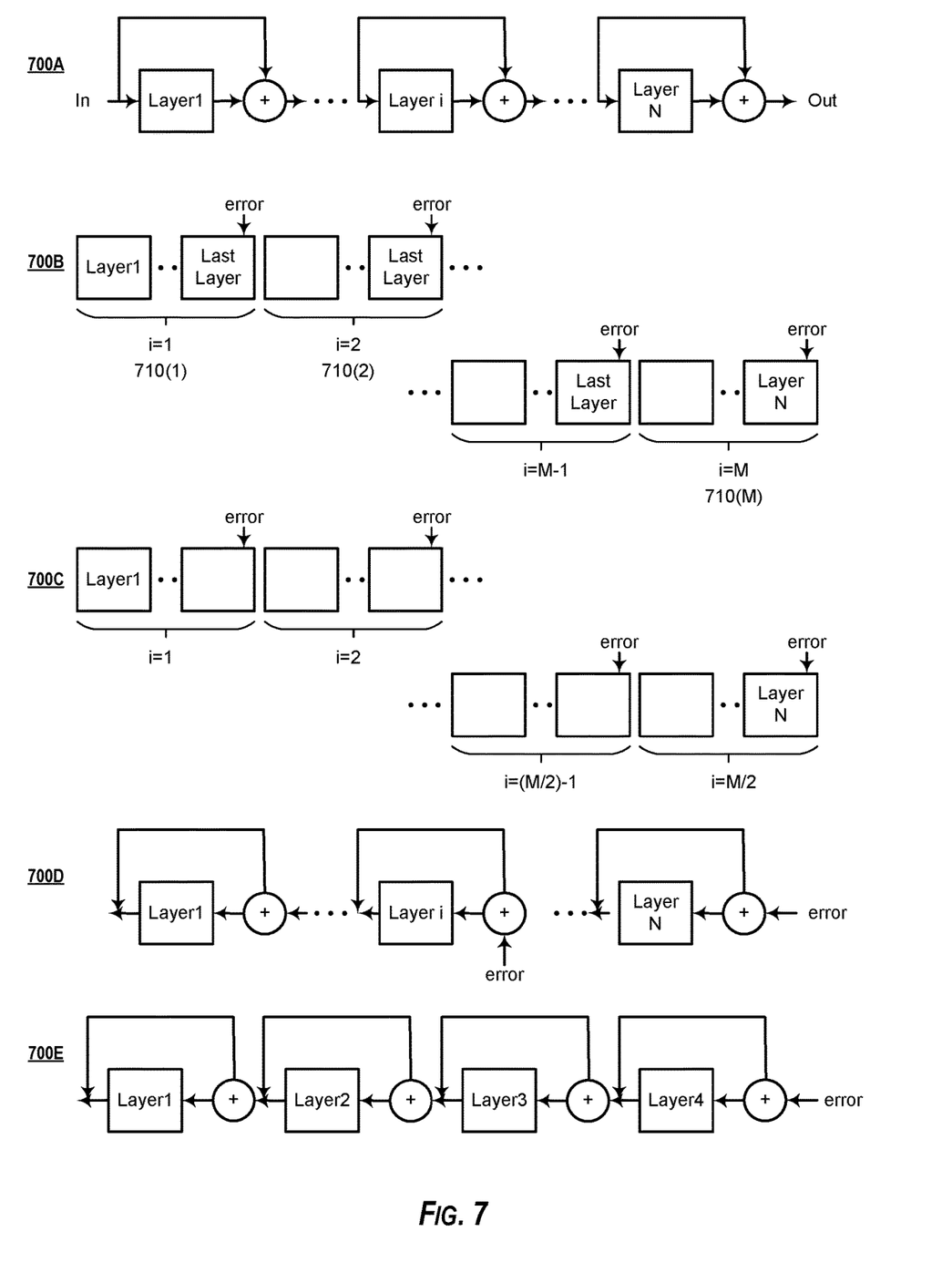
FIG. 7 illustrates neural network training according to another embodiment.

FIG. 7 illustrates neural network training according to another embodiment. In some embodiments, the weights in each of the layers in each of the sections may be adjusted over one or more cycles of the input data and the output results, and the number of sections may be reduced by a factor of two (2). The weight adjustment and reduction in sections may be repeated until the error is backpropagated through the whole network (e.g., the number of sections is equal to one (1)). For example, 700A in FIG. 7 shows an N layer residual neural network configured in a pipeline to received data inputs on a network input, IN, and produce output results on a network output, OUT. 700B illustrates segmenting the layers into a plurality of sections 710(1)-710(M). Each section may comprise one or more layers, for example. During training, an error is coupled to a last layer of each section. In this example, the sections are based on powers of two (2)—e.g., the network is divided in half, fourths, eighths, etc. If the M sections are labeled i=1-M, then the error may be coupled to an intermediate output for the last layer in each of the M sections, where M=2, 4, 8, 16, 32, etc. . . . , for example. In this example, the weights in the layers for each section are trained independently based on the error input to each intermediate output. At 700C, the number of sections is reduced by a factor of two (2). Thus, there are M/2 sections in the network at 700C. Each section is again trained and the weights in each layer adjusted. When the number of sections is reduced by a factor of two (2), the number of layers in each section increases by a factor of two (2). The above process is repeated until there are two sections as illustrated at 700D (e.g., the error is applied to the output and an intermediate output at a mid-point in the network), and then just one section as illustrated at 700E (e.g., the full network). Applying the above described training technique may reduce memory usage and improve convergence and accuracy, for example.

Figure 8:
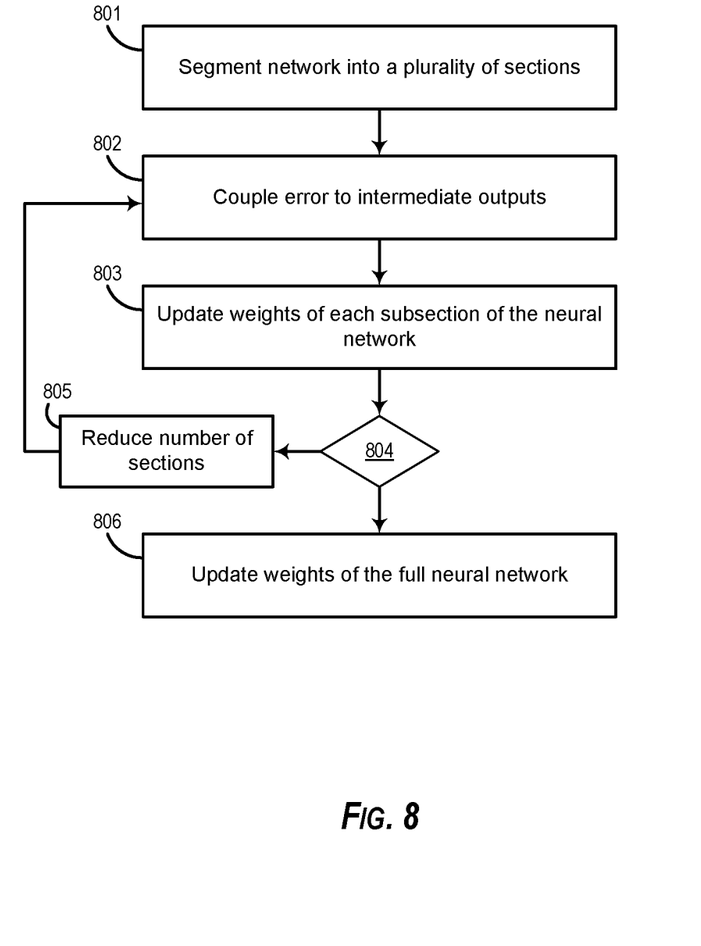
FIG. 8 illustrates an example method according to another embodiment.

FIG. 8 illustrates an example method according to another embodiment. In this example, a neural network is segmented into a plurality of sections at 801. At 802, an error at the output of the network is coupled to last layers of each of the plurality of sections. At 803, the weights are updated in each of the layers for each of the sections based on the error. At 804, the system determines if further reduction of sections is to occur and the number of sections may be reduced at 805. Steps 802 and 803 may be repeated until one section remains (e.g., the entire network). The error may be backpropagated through the entire network at 806 and the weights updated.

Figure 9:
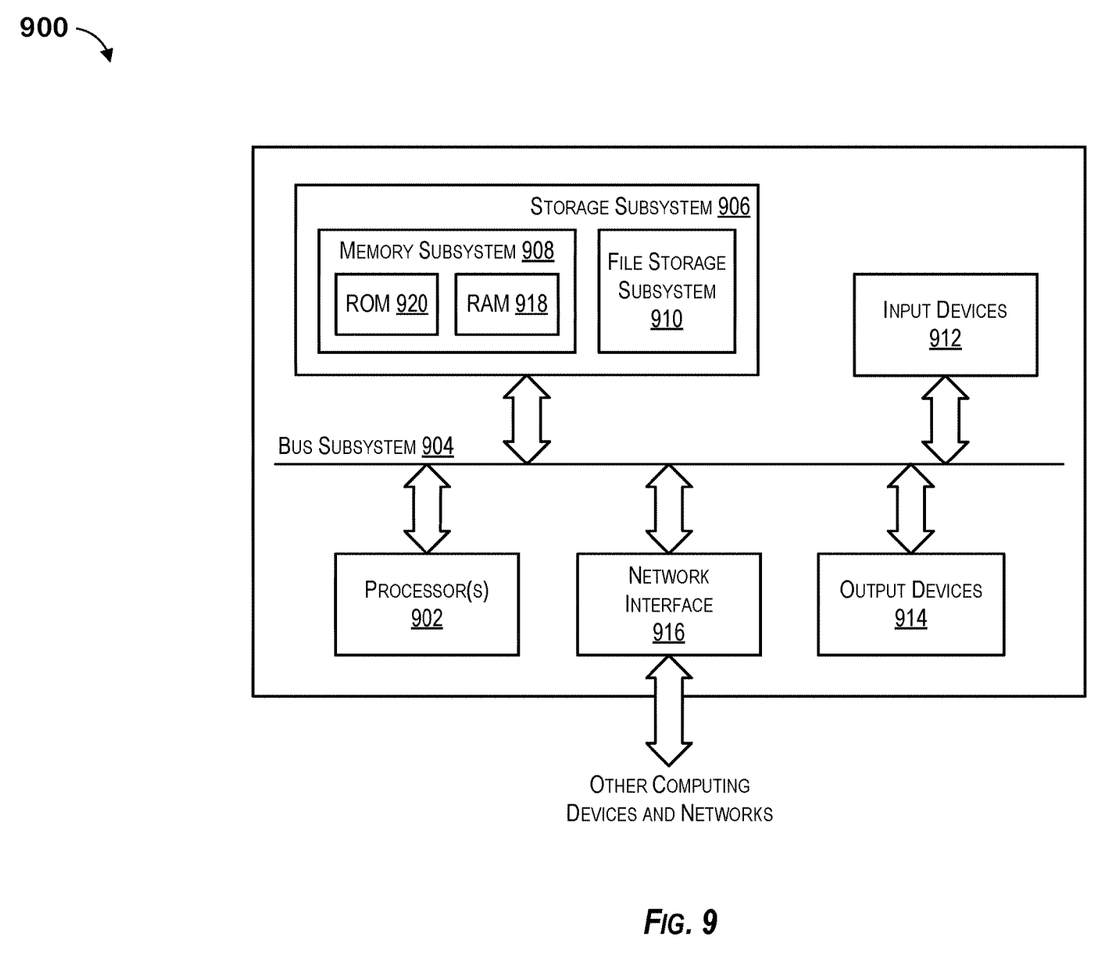
FIG. 9 depicts a simplified block diagram of an example computer system according to certain embodiments.

The techniques describe above may be implemented in a wide range of computer systems configured to process neural networks. FIG. 9 depicts a simplified block diagram of an example computer system 900, which can be used to implement the techniques described in the foregoing disclosure. As shown in FIG. 9, computer system 900 includes one or more processors 902 that communicate with a number of peripheral devices via a bus subsystem 904. These peripheral devices may include a storage subsystem 906 (e.g., comprising a memory subsystem 908 and a file storage subsystem 910) and a network interface subsystem 916. Some computer systems may further include user interface input devices 912 and/or user interface output devices 914.

Bus subsystem 904 can provide a mechanism for letting the various components and subsystems of computer system 900 communicate with each other as intended. Although bus subsystem 904 is shown schematically as a single bus, alternative embodiments of the bus subsystem can utilize multiple busses.

Network interface subsystem 916 can serve as an interface for communicating data between computer system 900 and other computer systems or networks. Embodiments of network interface subsystem 916 can include, e.g., Ethernet, a Wi-Fi and/or cellular adapter, a modem (telephone, satellite, cable, ISDN, etc.), digital subscriber line (DSL) units, and/or the like.

Storage subsystem 906 includes a memory subsystem 908 and a file/disk storage subsystem 910. Subsystems 908 and 910 as well as other memories described herein are examples of non-transitory computer-readable storage media that can store executable program code and/or data that provide the functionality of embodiments of the present disclosure.

Memory subsystem 908 includes a number of memories including a main random access memory (RAM) 918 for storage of instructions and data during program execution and a read-only memory (ROM) 920 in which fixed instructions are stored. File storage subsystem 910 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and many other configurations having more or fewer components than system 900 are possible.

Figure 10:
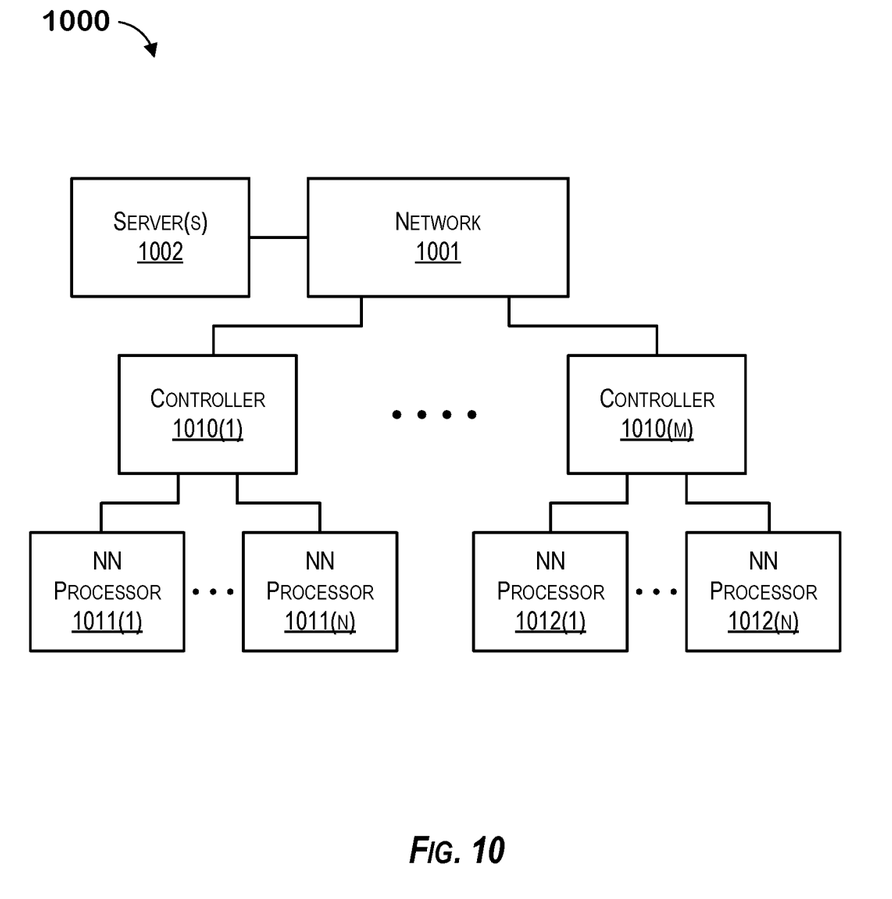
FIG. 10 illustrates a neural network processing system according to some embodiments.

FIG. 10 illustrates a neural network processing system according to some embodiments. In various embodiments, neural networks according to the present disclosure may be implemented and trained in a hardware environment comprising one or more neural network processors. A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 1002, which may comprise architectures illustrated in FIG. 9 above, may be coupled to a plurality of controllers 1010(1)-1010(M) over a communication network 1001 (e.g. switches, routers, etc.). Controllers 1010(1)-1010(M) may also comprise architectures illustrated in FIG. 9 above. Each controller 1010(1)-1010(M) may be coupled to one or more NN processors, such as processors 1011(1)-1011(N) and 1012(1)-1012(N), for example. NN processors 1011(1)-1011(N) and 1012(1)-1012(N) may include a variety of configurations of functional processing blocks and memory optimized for neural network processing, such as training or inference. The NN processors are optimized for neural network computations. Server 1002 may configure controllers 1010 with NN models as well as input data to the models, which may be loaded and executed by NN processors 1011(1)-1011(N) and 1012(1)-1012(N) in parallel, for example. Models may include layers and associated weights as described above, for example. NN processors may load the models and apply the inputs to produce output results. NN processors may also implement training algorithms described herein, for example.

FURTHER EXAMPLE EMBODIMENTS

In various embodiments, the present disclosure includes systems, methods, and apparatuses for neural network training. The techniques described herein may be embodied in non-transitory computer readable storage medium having stored thereon program code executable by a computer system, the program code causing the computer system to perform the techniques described herein. In some embodiments, the computer system includes one or more processors and a memory configured with program code to perform the techniques described above. In some embodiments, the non-transitory computer readable storage medium may be memory, for example, which may be coupled to one or more controllers or one or more artificial intelligence processors, for example.

The following techniques may be embodied alone or in different combinations and may further be embodied with other techniques described herein.

For example, in one embodiment, the present disclosure includes a computer system comprising: one or more processors; and a non-transitory computer readable storage medium having stored thereon program code executable by the computer system, the program code causing the computer system to perform a method comprising: determining an error at an output of a residual feedforward neural network based on output results generated in response to input data and weights of the residual feedforward neural network; and propagating the error in a reverse direction through the residual feedforward neural network from the output and one or more intermediate outputs of the residual feedforward neural network to adjust the weights of the residual feedforward neural network.

In one embodiment, the error is directly coupled to the output and the one or more intermediate outputs.

In one embodiment, the present disclosure further comprising successively reducing the number of intermediate outputs over a plurality of training cycles.

In one embodiment, the residual feedforward neural network comprises a plurality of layers.

In one embodiment, an input to each layer is added to an output of each layer.

In one embodiment, the residual feedforward neural network is segmented into a plurality of sections, and wherein the error is input into a last layer of each section.

In one embodiment, a number of sections is equal to a power of two (2).

In one embodiment, the sections comprise an equal number of layers.

In one embodiment, the present disclosure further comprises adjusting the weights in each of the plurality of layers for each of the plurality of sections over one or more cycles of said input data and said output results; reducing the number of sections; and repeating said adjusting and reducing steps for a plurality of different numbers of sections.

In one embodiment, the present disclosure further comprises adjusting the weights in each of the plurality of layers for each of the plurality of sections over one or more cycles of said input data and said output results; reducing the number of sections by a factor of two (2); and repeating said adjusting and reducing steps for a plurality of different numbers of sections including the number of sections equal to one (1).

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer system comprising:
   one or more processors; and
   a non-transitory computer readable storage medium having stored thereon program code executable by the computer system, the program code causing the computer system to perform a method comprising:
   determining an error at an output of a residual feedforward neural network based on output results generated in response to input data and weights of the residual feedforward neural network; and
   propagating the error in a reverse direction through the residual feedforward neural network from the output and one or more intermediate outputs of the residual feedforward neural network to adjust the weights of the residual feedforward neural network,
   wherein the residual feedforward neural network comprises a plurality of layers,
   wherein the residual feedforward neural network is segmented into a plurality of sections, and wherein the error is input into a last layer of each section.

2. The computer system of claim 1 wherein the error is directly coupled to the output and the one or more intermediate outputs.

3. The computer system of claim 1, the method further comprising successively reducing a number of intermediate outputs over a plurality of training cycles.

4. The computer system of claim 1 wherein a number of sections is equal to a power of two (2).

5. The computer system of claim 1 wherein the sections comprise an equal number of layers.

6. The computer system of claim 1, the method further comprising:
   adjusting weights in each of the plurality of layers for each of the plurality of sections over one or more cycles of said input data and said output results;
   reducing a number of sections; and
   repeating said adjusting and reducing steps for a plurality of different numbers of sections.

7. A method of training a neural network comprising:
   determining an error at an output of a residual feedforward neural network based on output results generated in response to input data and weights of the residual feedforward neural network; and
   propagating the error in a reverse direction through the residual feedforward neural network from the output and one or more intermediate outputs of the residual feedforward neural network to adjust the weights of the residual feedforward neural network,
   wherein the residual feedforward neural network comprises a plurality of layers,
   wherein the residual feedforward neural network is segmented into a plurality of sections, and wherein the error is input into a last layer of each section.

8. The method of claim 7 further comprising successively reducing a number of intermediate outputs over a plurality of training cycles.

9. The method of claim 7 wherein a number of sections is equal to a power of two (2).

10. The method of claim 7 wherein the sections comprise an equal number of layers.

11. The method of claim 7 further comprising:
    adjusting weights in each of the plurality of layers for each of the plurality of sections over one or more cycles of said input data and said output results;
    reducing the number of sections by a factor of two (2); and
    repeating said adjusting and reducing steps for a plurality of different numbers of sections including the number of sections equal to one (1).

12. A non-transitory computer readable storage medium having stored thereon program code executable by a computer system, the program code causing the computer system to:
    determine an error at an output of a residual feedforward neural network based on output results generated in response to input data and weights of the residual feedforward neural network; and
    propagate the error in a reverse direction through the residual feedforward neural network from the output and one or more intermediate outputs of the residual feedforward neural network to adjust the weights of the residual feedforward neural network,
    wherein the residual feedforward neural network comprises a plurality of layers,
    wherein the residual feedforward neural network is segmented into a plurality of sections, and wherein the error is input into a last layer of each section.

13. The non-transitory computer readable storage medium of claim 12, wherein the program code further causes the computer system to successively reducing a number of intermediate outputs over a plurality of training cycles.

14. The non-transitory computer readable storage medium of claim 12 wherein a number of sections is equal to a power of two (2).

15. The non-transitory computer readable storage medium of claim 12 further comprising:
    adjusting weights in each of the plurality of layers for each of the plurality of sections over one or more cycles of said input data and said output results;
    reducing the number of sections by a factor of two (2); and
    repeating said adjusting and reducing steps for the different number of sections including the number of sections equal to one (1).

* * * * *